US006421096B1

(12) United States Patent
Nguyen

(10) Patent No.: US 6,421,096 B1
(45) Date of Patent: *Jul. 16, 2002

(54) ANALOG VIDEO CHROMAKEY MIXER

(75) Inventor: Julien T. Nguyen, Saratoga, CA (US)

(73) Assignee: Sigman Designs, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/765,464

(22) PCT Filed: Jun. 27, 1995

(86) PCT No.: PCT/US95/08279

§ 371 (c)(1),
(2), (4) Date: Jan. 5, 1998

(87) PCT Pub. No.: WO96/01027

PCT Pub. Date: Jan. 11, 1996

(51) Int. Cl.[7] .............................................. H04N 9/75
(52) U.S. Cl. ....................................... 348/587; 348/592
(58) Field of Search ............................. 348/510, 511, 348/590–601, 584–589, 914, 180, 192, 189, 190, 518, 519; 345/114, 115, 113, 116; H04N 9/74, 9/75

(56) References Cited

U.S. PATENT DOCUMENTS

| 3,846,762 A | 11/1974 | Gregory et al. .......... 340/172.5 |
| 3,908,080 A | 9/1975 | Broadbent ................ 178/6.6 R |
| 3,947,826 A | 3/1976 | Bockwoldt ................. 340/173 |
| 4,092,673 A | 5/1978 | Adams |
| 4,353,057 A | 10/1982 | Bernet et al. ................ 340/347 |
| 4,394,650 A | 7/1983 | Long et al. .................. 340/728 |
| 4,425,581 A | 1/1984 | Schweppe et al. .......... 358/148 |
| 4,498,098 A | 2/1985 | Stell ............................ 358/22 |
| 4,523,227 A | 6/1985 | Hurst .......................... 358/105 |

(List continued on next page.)

FOREIGN PATENT DOCUMENTS

| EP | 0 384 257 | 8/1990 | ............ G09G/1/16 |
| EP | 0 384 419 | 8/1990 | ............ G09G/1/16 |
| JP | 1175374 | 11/1989 | .......... H04N/5/265 |
| WO | WO 9210911 | 6/1992 | |

OTHER PUBLICATIONS

Brunhoff, T., "VEX Provides Mechanism for Integrating Graphics and Video"; Computer Technology Review; Nov. 10, 1990, No. 1, pp. 107–111.

Tsai Y T: "Color Image Compression for Single–Chip Cameras" IEEE Transactions on Electron Devices, vol. 38, No. 5, May 1, 1991, pp. 1226–1232, XP000200683, see abstract; figures 1,6.

*Primary Examiner*—Michael Lee
(74) *Attorney, Agent, or Firm*—Swernofsky Law Group PC

(57) ABSTRACT

An improved technique for mixing picture signals directed at a monitor screen. Two analog video signals (such as an analog VGA input and an analog RGB signal produced in response to a stored digital still or moving image) may be multiplexed in analog form. An analog chromakey mixer detects a background color in the first video signal (such as the analog VGA input), and replaces the portion of that first video signal with the second video signal. The time delays of the first video and the second video signal may be adjusted so that they reach the monitor screen (by means o a multiplexer output) at the same time. An alignment detector may attempt to align chromakey mixer until the time difference between the first and the second video signals falls below a threshold.

45 Claims, 3 Drawing Sheets

U.S. PATENT DOCUMENTS

| | | | |
|---|---|---|---|
| 4,528,561 A | 7/1985 | Kitamura | 340/745 |
| 4,580,165 A | 4/1986 | Patton et al. | 358/148 |
| 4,587,633 A | 5/1986 | Wang et al. | 364/900 |
| 4,626,837 A | 12/1986 | Priestly | 340/723 |
| 4,628,479 A | 12/1986 | Borg et al. | 364/900 |
| 4,675,612 A | 6/1987 | Adams et al. | 328/63 |
| 4,680,622 A | 7/1987 | Barnes et al. | 358/22 |
| 4,684,936 A | 8/1987 | Brown et al. | 340/721 |
| 4,713,621 A | 12/1987 | Nakamura et al. | 328/55 |
| 4,757,310 A | 7/1988 | Katsura et al. | 340/798 |
| 4,779,210 A | 10/1988 | Katsura et al. | 364/521 |
| 4,811,084 A | 3/1989 | Belmares-Sarabia et al. | |
| 4,811,205 A | 3/1989 | Normington et al. | 364/900 |
| 4,814,879 A | 3/1989 | McNeely | 358/148 |
| 4,823,260 A | 4/1989 | Imel et al. | |
| 4,862,392 A | 8/1989 | Steiner | 364/522 |
| 4,870,406 A | 9/1989 | Gupta et al. | 340/70 |
| 4,876,600 A | 10/1989 | Pietzsch et al. | 358/183 |
| 4,876,660 A | 10/1989 | Owen et al. | |
| 4,891,631 A | 1/1990 | Fredlund et al. | 340/709 |
| 4,905,189 A | 2/1990 | Brunolli | 364/900 |
| 4,907,086 A | 3/1990 | Truong | 358/183 |
| 4,916,301 A | 4/1990 | Mansfield et al. | 340/747 |
| 4,947,257 A | 8/1990 | Fernandez et al. | 358/183 |
| 4,947,342 A | 8/1990 | Katsura et al. | 364/518 |
| 4,951,229 A | 8/1990 | DiNicola et al. | 364/521 |
| 4,953,101 A | 8/1990 | Kelleher et al. | 364/518 |
| 4,994,912 A | 2/1991 | Lumelsky et al. | 358/140 |
| 5,027,212 A | 6/1991 | Marlton et al. | 358/183 |
| 5,046,023 A | 9/1991 | Katsura et al. | 364/518 |
| 5,065,346 A | 11/1991 | Kawai et al. | 395/128 |
| 5,097,257 A | 3/1992 | Clough et al. | 340/814 |
| 5,099,331 A | 3/1992 | Truong | 358/183 |
| 5,111,292 A | 5/1992 | Kuriacose et al. | 358/133 |
| 5,111,409 A | 5/1992 | Gasper et al. | 395/152 |
| 5,122,875 A | 6/1992 | Raychaudhuri et al. | 358/133 |
| 5,138,307 A | 8/1992 | Tatsumi | 340/721 |
| 5,142,380 A | 8/1992 | Sakagami et al. | 358/432 |
| 5,151,875 A | 9/1992 | Sato | 364/784 |
| 5,157,716 A | 10/1992 | Naddor et al. | 379/92 |
| 5,168,356 A | 12/1992 | Acampora et al. | 358/133 |
| 5,185,665 A | 2/1993 | Okura et al. | 358/183 |
| 5,191,410 A | 3/1993 | McCalley et al. | 358/86 |
| 5,191,548 A | 3/1993 | Balkanski et al. | 364/725 |
| 5,196,946 A | 3/1993 | Balkanski et al. | 358/433 |
| 5,208,745 A | 5/1993 | Quentin et al. | 364/188 |
| 5,218,431 A | 6/1993 | Gleicher et al. | 358/13 |
| 5,220,312 A | 6/1993 | Lumelsky et al. | 340/721 |
| 5,231,492 A | 7/1993 | Dangi et al. | 358/143 |
| 5,243,447 A | 9/1993 | Bodenkamp et al. | 345/133 |
| 5,253,078 A | 10/1993 | Balkanski et al. | 358/426 |
| 5,270,832 A | 12/1993 | Balkanski et al. | 358/432 |
| 5,289,276 A | 2/1994 | Siracusa et al. | 348/467 |
| 5,309,111 A | 5/1994 | McNeely et al. | 328/133 |
| 5,309,567 A | 5/1994 | Mizukami | 395/325 |
| 5,329,630 A | 7/1994 | Baldwin | 395/425 |
| 5,333,261 A | 7/1994 | Guttag et al. | 395/162 |
| 5,341,318 A | 8/1994 | Balkanski et al. | 364/725 |
| 5,371,861 A | 12/1994 | Keener et al. | 395/325 |
| 5,379,356 A | 1/1995 | Purcell et al. | 382/56 |
| 5,392,239 A | 2/1995 | Margulis et al. | 365/189.01 |
| 5,397,853 A | 3/1995 | Koguchi | 84/609 |
| 5,402,147 A | 3/1995 | Chen et al. | 345/115 |
| 5,406,306 A | 4/1995 | Siann et al. | 345/115 |
| 5,416,749 A | 5/1995 | Lai | 365/240 |
| 5,426,756 A | 6/1995 | Shyi et al. | 395/425 |
| 5,434,913 A | 7/1995 | Tung et al. | 379/202 |
| 5,446,501 A | 8/1995 | Takemoto et al. | 348/620 |
| 5,450,542 A | 9/1995 | Lehman et al. | 395/162 |
| 5,450,544 A | 9/1995 | Dixon et al. | 395/164 |
| 5,471,576 A | 11/1995 | Yee | 395/154 |
| 5,528,309 A * | 6/1996 | Nguyen | 348/587 |
| 5,574,872 A | 11/1996 | Malinowski et al. | 358/451 |
| 5,638,130 A | 6/1997 | Linzer | 348/445 |
| 5,650,824 A | 7/1997 | Huang | 348/453 |
| 5,719,511 A | 2/1998 | Le Cornec et al. | |
| 5,832,120 A | 11/1998 | Prabhakar et al. | 382/233 |
| 5,982,459 A | 11/1999 | Fandrianto et al. | 348/845.2 |

* cited by examiner

ANALOG VIDEO CHROMAKEY MIXER

BACKGROUND OF THE INVENTION

1. Field of the Invention

This invention relates to an analog video chromakey mixer.

2. Description of Related Art

When still or moving images in digital form are displayed in a computer system, the digital images must generally be decoded and displayed as images on a computer monitor screen. Typically, the monitor screen is the only monitor screen in the computer system. However, those decoded and displayed images must be coordinated with other display signals directed at the same monitor screen, such as those signals directed that the monitor screen by an RGB or VGA monitor driver. Typically, the two sets of signals directed at the monitor screen must be multiplexed in some way.

Generally, it is desired that the two sets of signals must be smoothly multiplexed, with no breaks that would be visible to the human eye. It is also generally desired that the two sets of signals should be multiplexed quickly, so that high quality, high speed images may be displayed. It is also generally desired that any method for multiplexing the two sets of signals should work with a wide variety of computer systems and with a minimum of adaptation required for any of them.

However, one problem that has arisen in the art is that high quality, high speed multiplexing of analog and digital video signals can be difficult. For example, if it were desired to digitize the analog video signals and multiplex them with the digital signals entirely digitally, it could require an A/D converter that produced 16 million colors (24 bits) at a 75 MHz pixel rate. Present A/D converters do not operate at this combination of precision and speed, at least not at anything near a reasonable cost for a personal computer system.

One method of the prior art has been to multiplex the digital data provided by the computer system's processor (or CPU) to the monitor driver. While this method sometimes achieves the goal of synchronizing digital and analog video sources, it has the drawback that it requires substantial information about the method of color encoding used by the VGA monitor driver. As monitor drivers have been changed with improvements in monitors and in drivers, this method also has the drawback that it may fail to work for certain classes of monitor drivers.

Accordingly, it is an object of the invention to provide an improved technique for mixing picture signals directed at a monitor screen.

SUMMARY OF THE INVENTION

The invention provides an improved technique for mixing picture signals directed at a monitor screen.

In a preferred embodiment, two analog video signals, such as an analog VGA input and an analog RGB signal produced in response to a stored digital still or moving image, may be multiplexed in analog form. An analog chromakey mixer detects a background color in the first video signal and replaces the portion of that first video signal with the second video signal.

In a preferred embodiment, the time delays of the first video signal and the second video signal may be adjusted so that they reach the monitor screen (by means of a multiplexer output) at the same time. An alignment detector may attempt to align two known signals (such as a VGA sync signal and a signal generated for this purpose), and may adjust a set of time delays in the analog chromakey mixer until the time difference between the first and second video signals falls below a threshold.

DESCRIPTION OF THE PREFERRED EMBODIMENT

System Architecture

Figure 1:
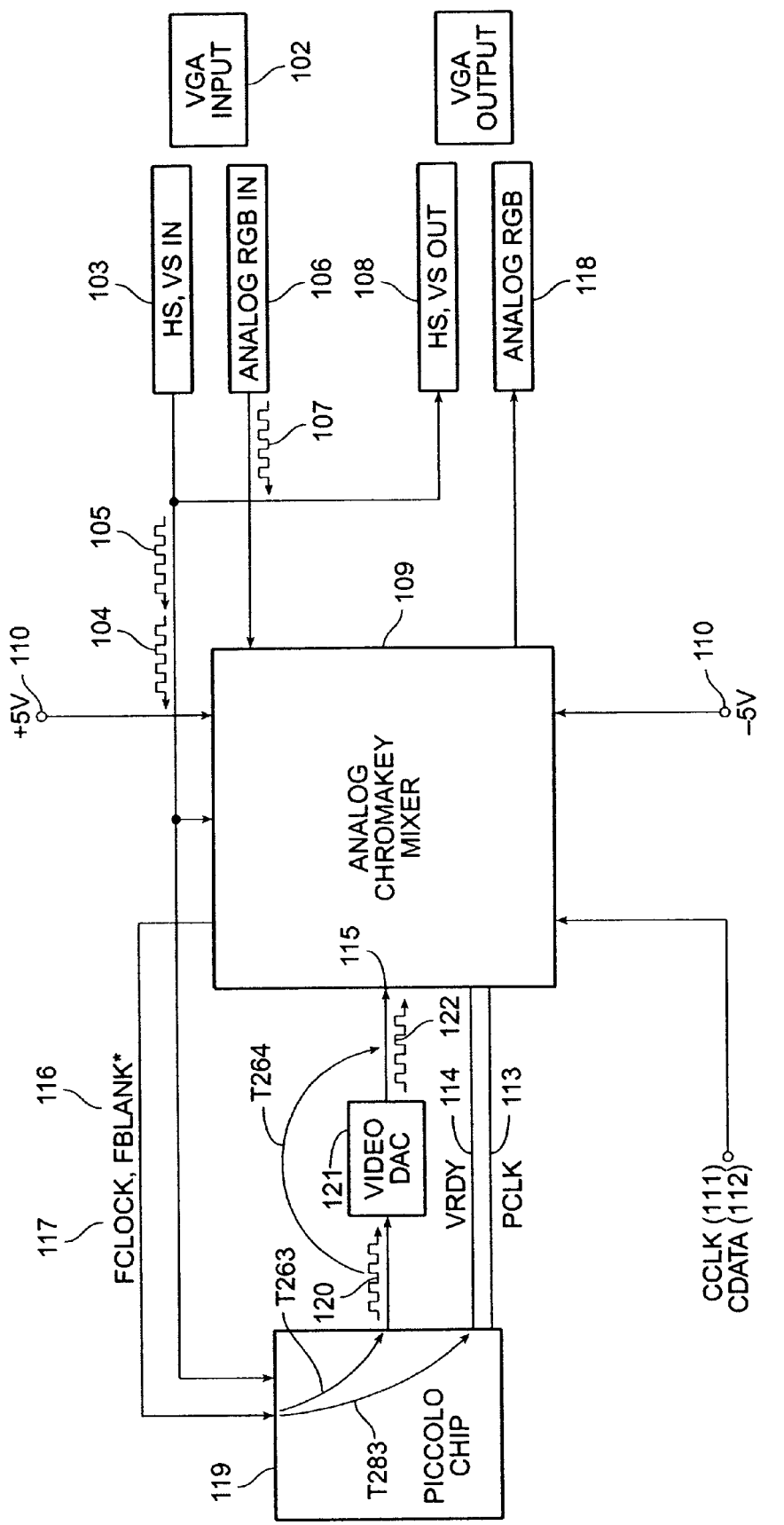
FIG. 1 shows a video system architecture.

FIG. 1 shows a video system architecture.

In a preferred embodiment, a video system 101 embedded in a computer system comprises a VGA input 102, having a sync input 103 for a horizontal sync (HS) signal 104 and a vertical sync (VS) signal 105, and having a first video input 106 for a first analog signal 107 (such as an analog RGB video signal). In a preferred embodiment, the VGA input 102 may be coupled to a VGA monitor driver, such as a personal computer system comprising a monitor driver card or another monitor driver circuit. VGA monitor drivers are known in the art. The sync input 103 is coupled to a sync output 108.

The sync input 103 and the first analog signal 107 are coupled to an analog chromakey mixer 109, which detects a key color in the analog RGB video signal and multiplexes the first analog signal 107 with a second analog RGB signal.

The analog chromakey mixer 109 is coupled to a set of reference voltages 110, comprising a +5 volt source and a −5 volt source in a preferred embodiment, to a CCLK signal 111 and a CDATA signal 112, for communication with the computer system, to a PCLK signal 113 and a VRDY signal 114, and to a second video input 115. The analog chromakey mixer 109 provides an output FBLANK signal 116 and an output FCLOCK signal 117, and a video output 118.

The sync input 103 is coupled to a digital signal processor (DSP) 119, which provides a digital video signal 120 having a sequence of digital pixels. The DSP 119 is coupled to the FBLANK signal 116 and the FCLOCK signal 117 from the analog chromakey mixer 109. The DSP 119 provides the PCLK signal 113 and the VRDY signal 114.

The digital video signal 120 is coupled to a video D/A converter 121, which converts the digital video signal 120 to a second analog signal 122 having a sequence of analog pixels. The second analog signal 122 is coupled to the analog chromakey mixer 109 at the second video input 115.

System Operation

In a preferred embodiment, the HS signal 104 and the VS signal 105 provide sync information for the first analog signal 107, and for the multiplexed video signal coupled to the video output 118.

The analog chromakey mixer 109 is described in further detail with reference to FIG. 2.

The reference voltages 110 provide power and logical references for the analog chromakey mixer 109. Reference voltages are known in the art. In a preferred embodiment, the reference voltages 110 may also be coupled to other circuits for similar purposes.

The CCLK signal 111 and a CDATA signal 112 are for communication with the computer system. These signals are used by the computer system to program voltage reference levels and internal registers of the analog chromakey mixer chip 109. Programming reference levels and internal registers of a chip by means of input signals is known in the art.

The PCLK signal 113 is a clock for the VRDY signal 114. The VRDY signal 114 indicates whether a digital pixel in the a digital video signal 120 comprises valid data.

The FBLANK signal 116 provides a composite blanking signal for the DSP 119. The FCLOCK signal 117 provides a pixel clock for the DSP 119.

In a preferred embodiment, the DSP 119 may comprise the Piccolo chip (available from Sigma Designs, Inc., of Fremont, Calif.).

In a preferred embodiment, the digital video signal 120 comprises a sequence of digital pixels, each having 8 bits of precision for each of three colors (red, green, and blue), at a rate of about 20 nanoseconds per digital pixel.

The D/A converter 121 converts each digital pixel to a set of three analog voltages, one for each of three colors. D/A converters are known in the art. In a preferred embodiment, the D/A converter 121 may comprise the BT121 device (available from Brooktree Corporation of San Diego, Calif.).

Analog Chromakey Mixer

Figure 2:
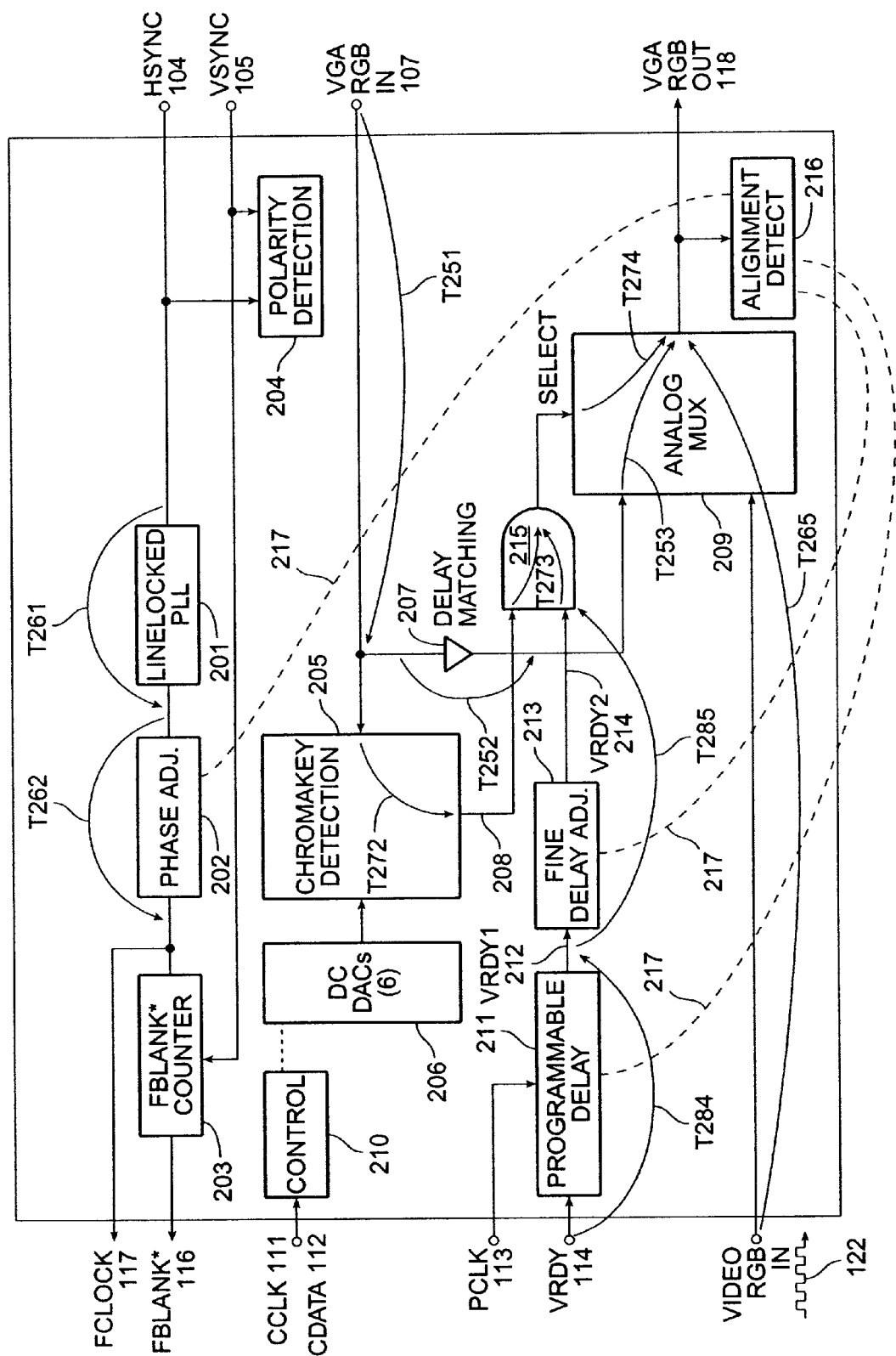
FIG. 2 shows a block diagram of an analog chromakey mixer.

FIG. 2 shows a block diagram of an analog chromakey mixer.

In a preferred embodiment, the HS signal 104 is coupled to a line locked phase locked loop (PLL) 201, which recovers a clock signal from the HS signal 104. Phase locked loops are known in the art. The line locked PLL 201 is coupled to a phase adjuster 202, which provides an adjustable delay. An output of the phase adjuster 202 provides the FCLOCK signal 117. The phase adjuster 202 is coupled to a counter 203, which provides the FBLANK signal 116.

The HS signal 104 and the VS signal 105 are coupled to a polarity detector 204. In a preferred embodiment, the HS signal 104 and the VS signal 105 may have any polarity. The polarity detector 201 uses the FCLOCK signal 117 to sample the HS signal 104; if the same value is sampled for more than 256 consecutive clock pulses, that value is considered to represent the inverse of the polarity of the HS signal 104. Similarly, the polarity detector 201 uses the FCLOCK signal 117 to sample the VS signal 105; if the same value is sampled for more than 256 consecutive clock pulses, that value is considered to represent the inverse of the polarity of the VS signal 105.

The first analog signal 107 is coupled to a chromakey detector 205, which determines whether a present analog pixel of the analog RGB video signal matches the color to be replaced (the chromakey). The chromakey detector 205 is coupled to a set of six D/A converters 206 that provide a set of three minimum/maximum values for the red (R), green (G), and blue (B) color components of the analog RGB video signal. The chromakey detector 205 determines a color match when the detected color falls within the minimum/maximum values for all three color components, and generates a match signal 208.

The first analog signal 107 is coupled, by means of a delay 207, to a first input of an analog multiplexer 209.

The CCLK signal 111 and the CDATA signal 112 are coupled to a control circuit 210, for programming voltage reference levels and internal registers of the analog chromakey mixer chip 109. Programming reference levels and internal registers of a chip by means of input signals is known in the art.

The PCLK signal 113 is used to clock the VRDY signal 114 to an input of a programmable delay 211, which provides an output VRDY1 signal 212. The VRDY1 signal 212 is coupled to a fine delay 213, which provides an output VRDY2 signal 214. The VRDY2 signal is coupled to an input of a logical AND gate 215.

The match signal 208 is coupled to another input of the logical AND gate 215. An output of the logical AND gate 215 is coupled to a select input of the analog multiplexer 209. The second analog signal 122 is coupled to a second input of the analog multiplexer 209. An output of the analog multiplexer 209 is coupled to the video output 118.

Analog Chromakey Mixer Operation

In a preferred embodiment, the chromakey detector 205 detects the chromakey in the first analog signal 107; the match signal 208 indicates that the chromakey detector 205 found a match. When a match is found, at the next valid pixel from the D/A converter 121, the match signal 208 and the VRDY signal 114 will both be logical "1", and the logical AND gate 215 will cause the analog multiplexer 209 to select the second analog signal 122 instead of the first analog signal 107.

A cumulative time delay t1 between input and output of the first analog signal 107 may comprise time delays as shown in table 2-1:

TABLE 2-1

| Time Delay | Cause of Time Delay |
|---|---|
| t251 | from the first video input 106 to an input of the delay 207 |
| t252 | across the delay 207 |
| t253 | from the output of the delay 207 to the output of the analog multiplexer 209 |
| Thus, t1 = t251 + t252 + t253, where t252 is adjustable. | |

A cumulative time delay t2 between input and output of the second video signal 122 may comprise time delays as shown in table 2-2:

TABLE 2-2

| Time Delay | Cause of Time Delay |
|---|---|
| t261 | across the line locked PLL 201 |
| t262 | across the phase adjuster 202 |
| t263 | from the output of the FCLOCK signal 117 to the output of the digital video signal 120 from the DSP 119 |
| t264 | across the D/A converter 121 |
| t265 | from the output of the D/A converter 121 to the output of the analog multiplexer 209 |
| Thus, t2 = t261 + t262 + t263 + t264 + t265, where t262 is adjustable. | |

A cumulative time delay t3 between input and output of the first video signal 107 may alternatively comprise time delays as shown in table 2-3:

TABLE 2-3

| Time Delay | Cause of Time Delay |
|---|---|
| t251 | from the first video input 106 to an input of the delay 207 |
| t272 | from the input of the delay 207 to the output of the chromakey detector 205 |
| t273 | from the output of the chromakey detector 205 to the output of the logical AND gate 215 |

TABLE 2-3-continued

| Time Delay | Cause of Time Delay |
|---|---|
| t274 | from the output of the logical AND gate 215 to the output of the analog multiplexer 209 |
| Thus, t3 = t251 + t272 + t273 + t274, where none of these values is adjustable. | |

A cumulative time delay t4 between input and output of the second video signal 122 may alternatively comprise time delays as shown in table 2-4:

TABLE 2-4

| Time Delay | Cause of Time Delay |
|---|---|
| t261 | across the line locked PLL 201 |
| t262 | across the phase adjuster 202 |
| t283 | from the output of the FCLOCK signal 117 to the output of the VRDY signal 114 from the DSP 119 |
| t284 | across the programmable delay 211 |
| t285 | across the fine delay 213 |
| t286 | from the output of the fine delay 213 to the output of the logical AND gate 215 |
| t274 | from the output of the logical AND gate 215 to the output of the analog multiplexer 209 |
| Thus, t4 = t261 + t262 + t283 + t284 + t285 + t286 + t274, where t262, t284, and t285 are adjustable. | |

In a preferred embodiment, all four cumulative time delays must be equal: t1=t2=t3=t4. Each time delay t1, t2, and t4, comprises at least one adjustable time delay. Cumulative time delay t1 comprises adjustable time delay t252. Cumulative time delay t2 comprises adjustable time delay t262. Cumulative time delay t4 comprises adjustable time delays t262, t284, and t285. Accordingly, adjusting time delays t252, t262, t284, and t285, allows all four cumulative time delays t1, t2, t3, and t4, to be adjusted until they are equal.

An alignment detector 216 is coupled to an output of the analog multiplexer 209. The alignment detector 216 is also coupled to a set of control lines 217, coupled to each device that controls an adjustable time delay: delay 207 (controlling time delay t252), phase adjuster 202 (controlling time delay t262), programmable delay 211 (controlling time delay t284), and fine delay 213 (controlling time delay t285).

In a preferred embodiment, delay 207 and programmable delay 211 may be set when the analog chromakey mixer 109 is manufactured, so that t1=t3. Thus, only t2 and t4 need to be adjusted, by adjusting t262 and t285.

Video Signal Matching

Figure 3:
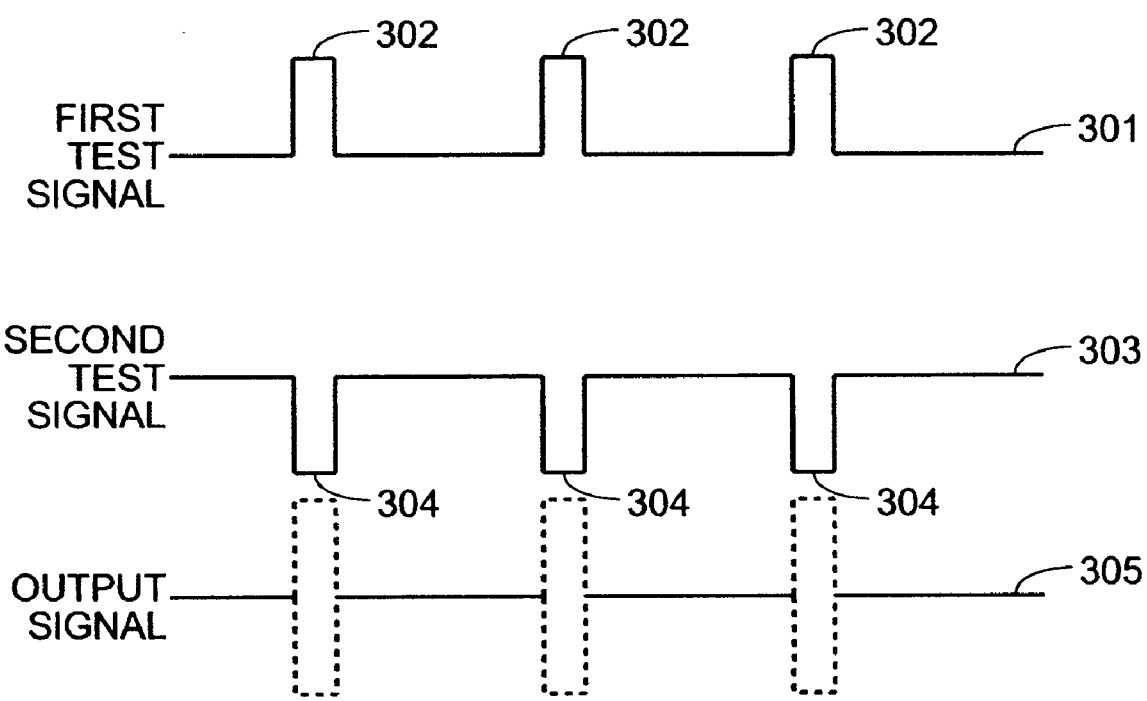
FIG. 3 shows signal waveforms for video signal matching.

FIG. 3 shows signal waveforms for video signal matching.

In a preferred embodiment, the alignment detector 216 may operate when the video system 101 is first powered on, or when the video system 101 is reset. During operation of the alignment detector 216, a first test signal 301 is generated and coupled to the first signal input 106 of the video system 101. The first test signal 301 comprises a sequence of spikes 302 of a first color, with a black background. A second test signal 303 is generated by the DSP 119 and coupled to the video system 101 as the digital video signal 120. The second test signal 303 comprises a background of a second color, with a sequence of black spikes 304.

The chromakey is set so that the positive voltage spikes 302 of the first test signal 301 are replaced by the black spikes 304 of the second test signal 303. The first test signal 301 and the second test signal 303 are generated so that when properly aligned, the output signal 305 from the video output 118 will be completely black.

The alignment detector 216 detects any color spikes in the output signal 305, whether the first color or the second color. If color spikes are not present, the first test signal 301 and the second test signal 303 are perfectly aligned, and no adjustment of time delays is needed. If color spikes are present, the first test signal 301 and the second test signal 303 are not perfectly aligned, and one or more time delays must be adjusted to obtain perfect alignment.

The alignment detector 216 adjusts the values of the time delays t262 and t285 until there are no color spikes (or at least until the color spikes are minimized) in the output signal 305. In a preferred embodiment, there are about 64 possible values for time delay t262 and about 64 possible values for time delay t285, so it is possible for the alignment detector 216 to try all possible values of time delays t262 and t285 in only a few seconds. Thereafter, there is no need to adjust any of the time delays further.

Alternative Embodiments

While preferred embodiments are disclosed herein, many variations are possible which remain within the concept and scope of the invention, and these variations would become clear to one of ordinary skill in the art after perusal of the specification, drawings and claims herein.

I claim:

1. A device, comprising
   means for receiving a first analog video signal;
   means for receiving a second analog video signal;
   means for detecting a chromakey in said first analog video signal and for generating a comparison signal in response thereto;
   means for replacing a portion of said first analog video signal with a portion of said second analog video signal in response to said comparison signal;
   means for measuring a difference between a first time delay and a second time delay, said first time delay comprising a delay from input to output of said first analog video signal, said second time delay comprising a delay from input to output of said second analog video signal; and
   means for adjusting said at least one time delay, so that said first time delay and said second time delay are substantially equal.

2. A device as in claim 1, wherein said means for adjusting comprises
   means for supplying a selected first video input to said means for receiving said first analog video signal;
   means for supplying a selected second video input to said means for receiving said second analog video signal;
   means for comparing an output of said means for replacing with a selected analog video signal; and
   means for controlling at least one time delay circuit in response to said means for comparing.

3. A device as in claim 1, wherein said means for adjusting comprises
   means for supplying a selected first video input to said means for receiving said first analog video signal;
   means for supplying a selected second video input to said means for receiving said second analog video signal;
   means for comparing an output of said means for replacing with a selected analog video signal; and means for controlling at least one time delay circuit to minimize a difference between said output of said means for replacing and said selected analog video signal.

4. A device as in claim 1, wherein said means for adjusting comprises means for supplying a selected first video input to said means for receiving said first analog video signal;

means for supplying a selected second video input to said means for receiving said second analog video signal;

means for comparing an output of said means for replacing with a selected analog video signal;

means for tentatively selecting a first and a second one of a plurality of possible time delays for said time delay circuit;

means for examining an output of said means for comparing for said first and said second one possible time delays, responsive to said means for tentatively selecting; and means for permanently selecting said first or said second one possible time delay in response to said means for examining.

5. A device as in claim 4, wherein said means for tentatively selecting repeatedly selects possible combinations of time delays for a plurality of time delay circuits until a difference between said output of said means for replacing and said selected analog video signal falls below a selected threshold.

6. A device as in claim 4, wherein said means for tentatively selecting selects substantially all possible combinations of time delays for a plurality of time delay circuits, and wherein said means for permanently selecting selects one of said substantially all possible combinations that minimizes a difference between said output of said means for replacing and said selected analog video signal.

7. A device as in claim 1, wherein said first analog video signal is an analog VGA input.

8. A device as in claim 1, wherein said means for replacing comprises an analog multiplexer coupled to said first analog video signal, said second analog video signal, and said comparison signal.

9. A device as in claim 1, wherein said second analog video signal is an analog RGB signal produced in response to a stored digital still or moving image.

10. A method comprising the steps of receiving a first analog video signal;

receiving a second analog video signal;

detecting a chromakey in said first analog video signal and generating a comparison signal in response thereto;

replacing a portion of said first analog video signal with a portion of said second analog video signal in response to said comparison signal;

adjusting at least one time delay between said means for receiving a first analog video signal and said means for replacing;

measuring a difference between a first time delay and a second time delay, said first time delay comprising a delay from input to output of said first analog video signal, said second time delay comprising a delay from input to output of said second analog video signal; and adjusting at least one time delay, so that said first time delay and said second time delay are substantially equal.

11. A method as in claim 10, wherein said step of adjusting comprises the steps of supplying a selected first video input;

supplying a selected second video input;

comparing a result of said step of replacing with a selected analog video signal; and controlling at least one time delay circuit in response to said step of comparing.

12. A method as in claim 10, wherein said step of adjusting comprises the steps of supplying a selected first video input;

supplying a selected second video input;

comparing a result of said step of replacing with a selected analog video signal; and controlling at least one time delay circuit to minimize a difference between said result of said step of replacing and said selected analog video signal.

13. A method as in claim 10, wherein said step of adjusting comprises the steps of supplying a selected first video input;

supplying a selected second video input;

comparing a result of said step of replacing with a selected analog video signal;

tentatively selecting a first and a second one of a plurality of possible time delays for said time delay;

examining a result of said step of comparing for said first and said second one possible time delays; and permanently selecting said first or said second one possible time delay in response to said step of examining.

14. A method as in claim 13, wherein said step of tentatively selecting selects substantially all possible combinations of time delays for a plurality of time delay circuits, and wherein said step of permanently selecting selects one of said substantially all possible combinations that minimizes a difference between said result of said step of replacing and said selected analog video signal.

15. A method as in claim 13, wherein said step of tentatively selecting is performed repeatedly to select possible combinations of time delays for a plurality of time delay circuits until a difference between said result of said step of replacing and said selected analog video signal falls below a selected threshold.

16. A method as in claim 14, wherein said step of receiving a second analog video signal comprises the steps of producing an analog RGB signal in response to a stored digital still or moving image, and receiving said analog RGB signal.

17. A method as in claim 14, wherein said step of replacing comprises the step of using an analog multiplexer coupled to said first analog video signal, said second analog video signal, and said comparison signal.

18. A method comprising the steps of:

receiving a first analog video signal;

converting a source of digital video to a second analog video signal;

mixing said first analog video signal and said second analog video signal;

measuring a difference between a first time delay and a second time delay, said first time delay comprising a delay from input to output of said first analog video signal, said second time delay comprising a delay from input to output of said second analog video signal; and adjusting at least one time delay, so that said first time delay and said second time delay are substantially equal.

19. A video system as in claim 18, comprising the step of displaying a result of said step of multiplexing.

20. A method comprising the steps of:

receiving a first analog video signal;

detecting a chromakey in said first analog video signal;

converting a source of digital video to a second analog video signal;

replacing a portion of said first analog video signal with a portion of said second analog video signal in response to said chromakey;

measuring a difference between a first time delay and a second time delay, said first time delay comprising a delay from input to output of said first analog video signal, said second time delay comprising a delay from input to output of said second analog video signal; and adjusting at least one time delay, so that said first time delay and said second time delay are substantially equal.

21. A method as in claim 20, comprising the step of displaying a result of said step of replacing.

22. A device as in claim 2, wherein said selected analog video signal comprises an all-black signal.

23. A method as in claim 11, wherein said selected analog video signal comprises an all-black signal.

24. Apparatus including a first input port disposed for receiving a first analog video signal;

a second input port disposed for receiving a second analog video signal;

a chromakey detector coupled to said first input port;

a multiplexer coupled to said chromakey detector, said first input port, and said second input port;

an output port coupled to said multiplexer;

an adjusting circuit disposed for adjusting a time delay in said apparatus, whereby a difference is minimized between a first time delay between said first input port and said output port and a second time delay between said second input port and said output port.

25. Apparatus as in claim 24, including a clock input port disposed for receiving a clock signal; and a detector coupled to said output port, said detector being responsive to an output signal appearing at said output port, said output signal including a plurality of horizontal lines each having a plurality of pixels, said pixels being responsive to said clock signal.

26. Apparatus as in claim 24, including a control input port disposed for receiving a signal indicative of a status of said second analog video signal.

27. Apparatus as in claim 26, including a circuit coupled to said control input port, to said chromakey detector, and to said multiplexer.

28. Apparatus as in claim 24, including a detector coupled to said output port, said detector being responsive to an output signal appearing at said output port, said output signal including a plurality of horizontal lines each having a plurality of pixels.

29. Apparatus as in claim 24, wherein said time delay includes a time delay between said chromakey detector and said multiplexer.

30. Apparatus as in claim 24, wherein said time delay includes a time delay between said first input port and said chromakey detector.

31. Apparatus as in claim 24, wherein said time delay includes a time delay between said first input port and said multiplexer.

32. Apparatus as in claim 24, wherein said time delay includes a time delay between said second input port and said chromakey detector.

33. Apparatus as in claim 24, wherein said time delay includes a time delay between said second input port and said multiplexer.

34. Apparatus as in claim 24, wherein said time delay includes a coarse time delay and a fine time delay.

35. A method including the steps of receiving a first analog video signal;

receiving a second analog video signal;

detecting a chromakey in said first analog video signal;

replacing at least a portion of said analog video signal with at least a portion of said second analog video signal in response to said chromakey;

outputting a resultant signal of said step of replacing;

adjusting a time delay, whereby a difference is minimized between a first time delay between said step of receiving said first analog video signal and said step of outputting and a second time delay between said step of receiving said second analog video signal and said step of outputting.

36. A method as in claim 35, including the steps of receiving a clock signal; and detecting said resultant signal, said resultant signal including a plurality of horizontal lines each having a plurality of pixels, said pixels being responsive to said clock signal.

37. A method as in claim 35, including the step of receiving a control signal, said control signal being indicative of a status of said second analog video signal.

38. A method as in claim 37, wherein said step of replacing is responsive to said control signal.

39. A method as in claim 35, including the step of detecting said resultant signal, wherein said resultant signal includes a plurality of horizontal lines each having a plurality of pixels.

40. A method as in claim 35, wherein said time delay includes a time delay between said step of detecting a chromakey and said step of replacing.

41. A method as in claim 35, wherein said time delay includes a time delay between said step of receiving a first analog video signal and said step of detecting a chromakey.

42. A method as in claim 35, wherein said time delay includes a time delay between said step of receiving a first analog video signal said step of replacing.

43. A method as in claim 35, wherein said time delay includes a time delay between said step of receiving a second analog video signal and said step of detecting a chromakey.

44. A method as in claim 35, wherein said time delay includes a time delay between said step of receiving a second analog video signal and said step of replacing.

45. A method as in claim 35, wherein said time delay includes a coarse time delay and a fine time delay.

* * * * *